Sept. 1, 1931.   C. A. MULLER   1,821,662
INTERNAL COMBUSTION ENGINE
Filed Jan. 12, 1925   4 Sheets-Sheet 2
-FIG. 3 -
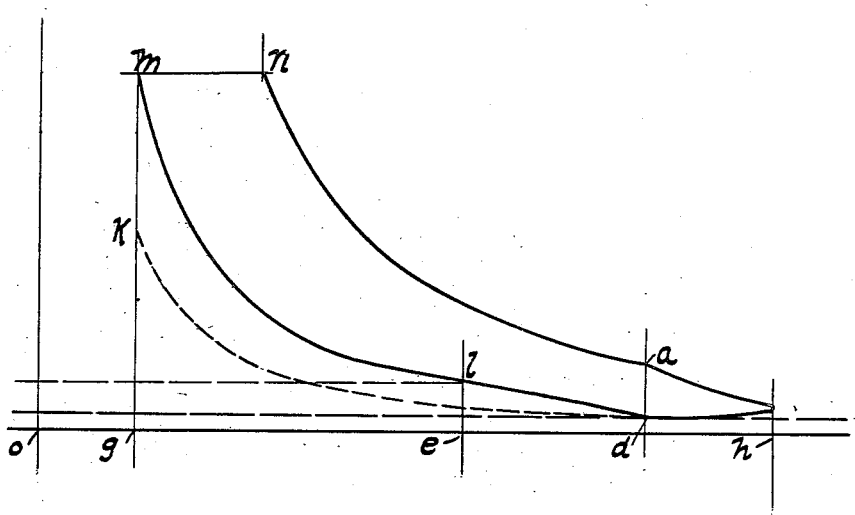
-FIG. 2 -
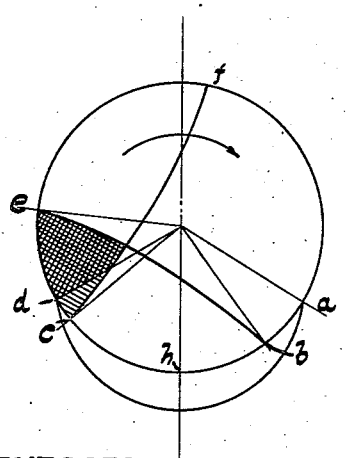
-FIG. 5 -
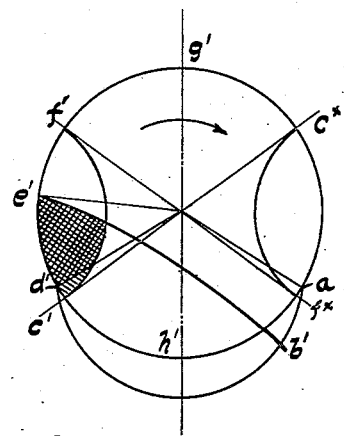
WITNESSES
A. S. Vanderbilt
S. R. Bell
INVENTOR
Charles A. Muller
By Clarence D. Kerr
Atty.

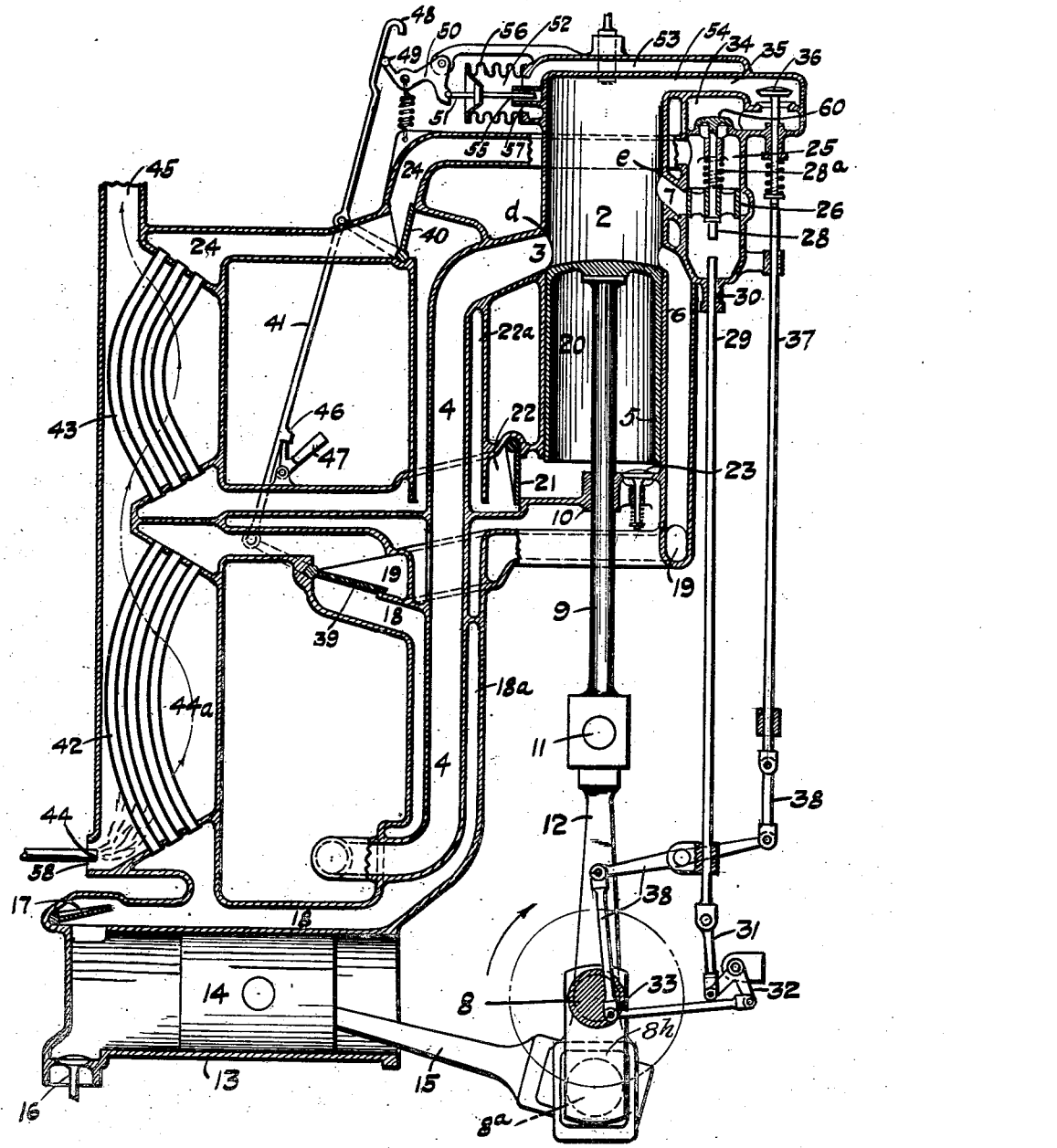

Sept. 1, 1931.  C. A. MULLER  1,821,662
INTERNAL COMBUSTION ENGINE
Filed Jan. 12, 1925  4 Sheets-Sheet 3
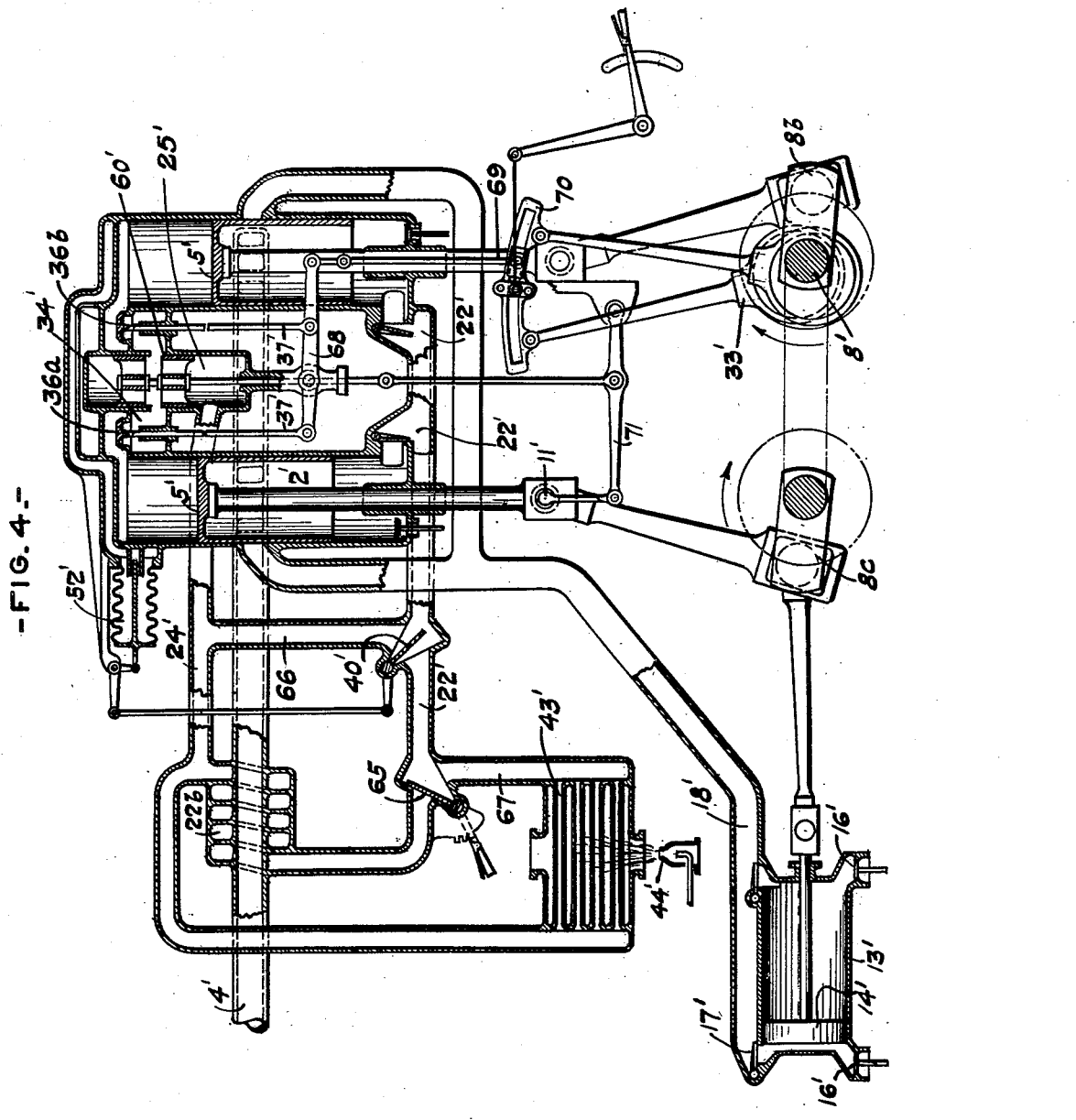
WITNESSES
A. S. Vanderbilt
S. R. Bell
INVENTOR
Charles A. Muller
By Clarence D. Kerr
Atty Sept. 1, 1931.  C. A. MULLER  1,821,662
INTERNAL COMBUSTION ENGINE
Filed Jan. 12, 1925  4 Sheets-Sheet 4
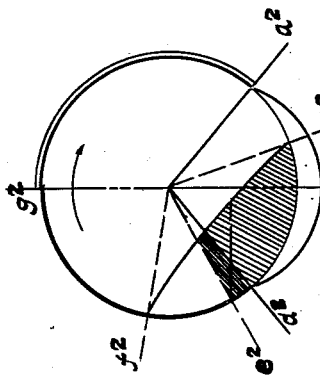
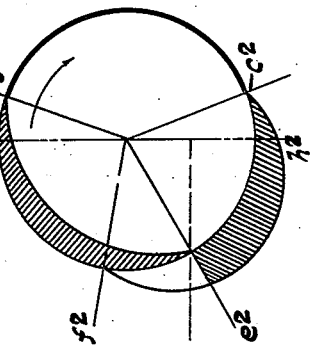
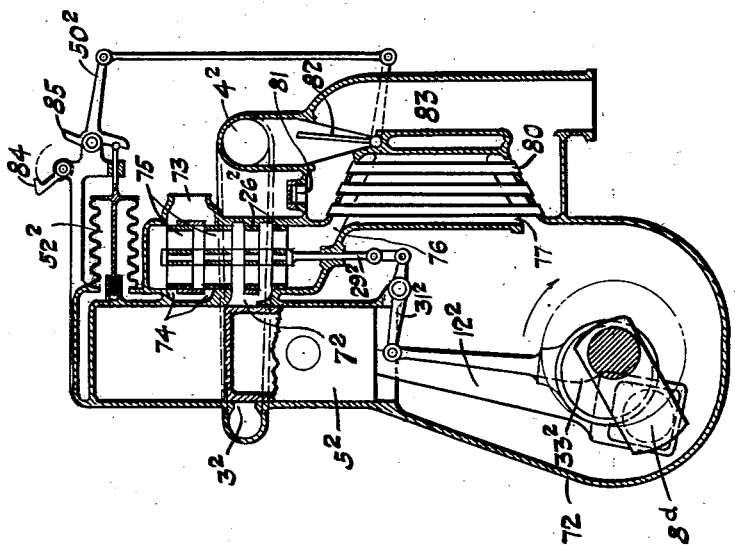
WITNESSES
A. S. Vanderbilt
S. R. Bell
INVENTOR
Charles A. Muller.
By Clarence D. Kerr
Atty.

Patented Sept. 1, 1931

1,821,662

UNITED STATES PATENT OFFICE

CHARLES A. MULLER, OF BROOKLYN, NEW YORK

INTERNAL COMBUSTION ENGINE

Application filed January 12, 1925. Serial No. 1,822.

My invention relates to engines, such as "Diesel" engines or "surface ignition" engines, using the temperature of compression and that of the surfaces exposed to combustion in whole or in part to ignite the fuel charge, and more especially to the engines in which the combustible is injected into the cylinders toward the end of the compression stroke of the pistons and at the beginning of the power stroke. The greatest difficulty in the way of successful operation of these engines, more especially when subject to great load variations, has been with the control of the temperatures at the end of the compression and during combustion.

My invention is for the purpose of controlling more closely these temperatures at any load under varying conditions and for such other advantages as better fuel economy, which will be more fully explained hereinafter.

In carrying out my invention not only is the amount of fuel admitted at each power stroke directly controlled, but a direct control is maintained also over the temperature of the air charge before compression in the engine cylinder; and this control is preferably but not necessarily automatic. I also provide for indirect control of the discharge pressure of the compressor through my direct temperature control coupled with automatic regulating means of the air delivery from the compressor.

I also maintain a direct control over the initial volume of air trapped in the power cylinder, which is designed to decrease the air charge weight when the initial volume is increased, while a volume reduction corresponds to a relatively increased weight of air, preferably as a means of adjustment.

In connection with my invention I disclose novel combinations of apparatus and means to introduce immediately before compression a comparatively large portion of the air charge into the power cylinder, preferably at a higher pressure than that of the portion of the charge already filling the cylinder.

While my invention is applicable to four-stroke cycle engines of the constant pressure type, or to engines of the so-called constant volume or explosion type, it is particularly applicable to two-stroke cycle engines in which the time periods for supercharging are relatively very short, and my improved method and means may be effectively employed for heavy supercharging in such engines within practical limits of pressures, volumes and temperatures. My invention also comprises the various features which I shall hereinafter describe and claim.

The improvement claimed is hereinafter fully set forth.

In the accompanying drawings: Figure 1 is a vertical section of a two-stroke cycle internal combustion engine of the constant pressure type, showing the essentials of my invention, but eliminating certain features not necessary to a clear understanding of the same; Fig. 2, a diagram, illustrating the relative positions between the points of opening and closing of the supercharging valves shown in Fig. 1, along the circumference described by the crank pin in a single revolution; Fig. 3, a conventional, pressure volume diagram applicable alike to the engines shown in Figs. 1 and 4; Fig. 4, a vertical section of an engine embodying a modified form of my invention; Fig. 5, a diagram, applicable to the engine of Fig. 4, illustrating the relative positions between the points of opening and closing of the supercharging valves, along the circumference described by the crank pin in a single revolution; Fig. 6, a vertical section of an engine illustrating a further modified form of my invention; Fig. 7, a diagram, applicable to the engine of Fig. 6, showing the relative positions between the points of opening and closing of the supercharging valves; and, Fig. 8, a diagram, applicable to the engine of Fig. 6, showing the opening and closing positions of the mechanically operated suction valve, and the same functions of the discharge valve for the pre-compression and discharge of the scavenging and charging air.

In the practice of my invention, referring descriptively to the specific embodiment thereof which is herein exemplified as applied to an internal combustion engine of the two stroke cycle type, the cylinder 2 has an exhaust port 3, leading into the exhaust pipe 4. The upper edge of the port 3 determines the point of exhaust closure by the power piston 5. In the cylinder wall are also a port 6 for admission of scavenging air, and a charging port 7. The piston 5 is connected to the main crank shaft 8 by the usual linkages, such as the piston rod 9 sliding through guide or stuffing box 10 and acting through wrist pin 11 and connecting rod 12, which is coupled to the crank pin $8^a$, secured in the end of the crank $8^h$, carried by the crank shaft 8. The low pressure scavenging air entering the port 6 is supplied by any convenient means, such as the air pump cylinder 13, the piston 14 of which is connected to the crank shaft 8 by the connecting rod 15 and crank pin $8^a$. The pump 13 has a suction valve 16 and a discharge valve 17 which delivers air into the pipe 18. From the pipe 18 the air is delivered through the jacket $18^a$, the duct 19 and port 6 to the cylinder 2.

The air used for supercharging is compressed by the piston 5, the under or concave side of which acts as a compressor piston and compresses the air between the lower part of the cylinder 2 and the inside of the piston, which forms with the stuffing box wall 10 a chamber 20, and is discharged through the valve 21 into a receiver or duct 22. The suction valve 23 allows the atmospheric air to enter the chamber 20 during the in-stroke of the piston 5. From the duct 22 the supercharging air passes through the pipes 24 into the valve chest 25 of the main charging valves 26 and 60. Each valve 26 is mounted on a rod 28 actuated by the spindle 29, which slides through the stuffing box 30 and is driven by a link 31 connected through a bell crank lever 32 with a pin 33 on the crank shaft 8. The valve 26 controls the passage of air into the cylinder 2 through the charging port 7, and the valve 60, which is also mounted on the spindle extension 28, controls the admission of air from the valve chest 25 into the intermediate space 34. The valve 60 is normally held down on its seat and the valve 26 across the port 7 by means of a spring $28^a$, and both these valves are opened by the upward movement of the spindle extension 28 caused by the elevation of the upper end of the spindle 29. The intermediate air space 34 communicates with the firing chamber 35 through the poppet valve 36.

The poppet valve 36 is operated by a valve stem 37 connected through linkage 38 to the pin 33. All of the air used in the engine is heat controlled after precompression in separate quantities and at different pressures, the heat regulation being effected by by-passing the air by means of the valves 39 and 40, actuated by any suitable means such as the lever 41, situated at the outlets of the auxiliary heating elements or tubes 42 and 43, which are connected respectively with the pipes 18 and 22 and can be heated by a common source of heat, such as the burner 44 located near the point at which the air enters the heating tubes 42 from the pipe 18. The products of combustion in rising first heat the tubes 42 and then pass upward around the tubes 43 and then out the stack 45, which may be connected with the exhaust.

When the engine, however, is running, the heating may be effected by the exhaust gases which pass through the port 3 into the exhaust pipe 4. The pipes or ducts 18 and 22 form jackets $18^a$ and $22^a$, respectively around the exhaust pipe 4, so that the air passing through such jackets becomes heated.

The scavenging or low pressure charging air emanating from the air pump 13 can be directed at will or automatically through the jacket $18^a$ or the tubes 42 into the duct 19 leading to the port 6, or through both in proportional amounts as controlled by the position of the flap valve 39.

The supercharging or higher pressure air emanating from the compressor chamber 20 can be directed as desired into the jacket $22^a$ or through the tubes 43, or through both in proportional amounts as controlled by the position of the valve 40, discharging through the pipe 24 into the valve chest 25 of the inlet valve 26. The valve 40 is manipulated by the rod 41, as is also the valve 39, which rod bears an integral locking spur 46 intended to be engaged by the hand controlled latch 47, so that when the latch is moved into the position shown in Fig. 1 the valves 39 and 40 will be closed and the air in the pipes 18 and 22 will be forced to pass respectively through the tubes 42 and 43. The free end 48 of the rod 41 is engaged by the end 49 of the bell crank lever 50, which is operated by the stem 51 of a thermostatic regulator 52.

The regulator 52 has fluid chamber 53, which extends over the wall 54 at the end of the combustion chamber of the cylinder 2 in such manner as to expose most effectively the thermostatic fluid in such chamber to the variations of the highest temperatures reached by the wall or walls, and communicates with the expansion chamber 55. The fluid is allowed to expand in the expansion chamber 55 by reason of the expansible wall 56 thereof, which at its outer edge is secured to the flange of the stem 51. The inner end of the stem 51 slides freely in the extension 57, formed on the exterior of the cylinder 2, by which the stem 51 and the wall 56 are supported and held in position.

It will thus be seen that as the stem 51 is moved inwardly or outwardly by the expansion or contraction of the thermostatic fluid, it will cause the rod 41, through the lever 50, to operate the valves 39 and 40 and thus control the amount of heat applied both to the scavenging air and the high pressure air by regulating the amount of such air passing through the jacket 18ª and 22ª.

Before starting the engine, the rod 41 is lifted and locked in the position shown in Fig. 1 by the latch 47, thus closing the valves 39 and 40 so that the air entering the pipe 18 from the pump 13 must pass through the tubes 42, and the air from the compressor chamber 20 must pass through the tubes 43. With the parts in such positions the burner 44 is lighted and heats the tubes 42 and 43. The engine is then started by any of the usual methods and the air from the pump and compressor circulates through the tubes 42 and 43. As soon as the exhaust duct 4 becomes sufficiently heated, the burner 44 is extinguished and the rod 41 is released from the latch 47. This permits the upper end 48 of the rod 41 to engage with the end 49 of the bell crank lever 50 of the thermostatic regulator 52. Before the cylinder 2 is warmed up, the thermostatic fluid is contracted in the expansion chamber 55, and the expansible wall 56 of such chamber is likewise contracted under the action of atmospheric pressure and the weight of the rod 41 as applied to the outer end of the stem 51, thus causing the valves 39 and 40 to be opened to the fullest extent, so that the scavenging air in the jacket 18ª and the supercharged air in the jacket 22ª will be exposed to the heating effect of the exhaust 4. Then, as the cylinder heats up, the thermostatic fluid will expand and by its movement of the rod 41 will vary the amount of the opening of the valves 39 and 40 and thus regulate the passage of the air through the jackets 18ª and 22ª. If desired, the heating elements 42 and 43 may act as radiating or intercooling elements, since an opening 58 may be provided about the burner 44 to permit the admission of a cooling element to pass through the auxiliary heating chamber 44ª, so that, under peak or overload, when the valves 39 and 40 are closed the air passing through the elements 42 and 43 will be cooled, and the temperature of the cylinders accordingly reduced.

When the engine passes through periods of practically no load, the burner 44 may be used simultaneously with the jackets 18ª and 22ª, by regulating the flame of the burner to cause the thermostatic regulator 52 to let only a small amount of air through the heater jackets 18ª and 22ª, such an amount being proportional to the heating capacity of the exhaust 4.

Referring now to the diagram of Fig. 2 in connection with the operation of the engine of Fig. 1, when the crank pin 8ª, moving in the direction of the arrow, reaches the point $a$ of the diagram, the exhaust port 3 is uncovered by the piston 5 on its outstroke and the exhaust begins. At this point the engine piston has entirely uncovered the cylinder port 7, but the valve 26 has not yet opened up the opposite end of the port 7. Following the down stroke of the piston the port 6 is uncovered, thus admitting low pressure air to enter for the scavenging action. But this function is not shown in the diagram of Fig. 2.

When the crank pin reaches the position corresponding to the point $b$ of the diagram, the valve 36 opens and the air trapped into the intermediate space 34, which has a definite predetermined volume, encounters the relatively small and decreasing resistance in the cylinder 2 due to the prior opening of the exhaust port 3, so that the air in the space 34 expands into the cylinder clearance 35 and scavenges the upper portion of the cylinder 2. During the movement of the crank pin 8ª from its point $b$ to point $c$ the valves 26 and 60 are still closed, so that there is no live air or direct connection with the source of the compressed air.

When the crank pin reaches the point $c$ the valves 26 and 60 begin to open and live air flows through the space 34 and through valve 36 and inlet port 7, respectively. Since the exhaust port 3 is about to be closed at point $d$ by the piston 5, practically none of the live air is lost through the exhaust, as the mechanism is so timed that the valves 26 and 60 in opening have merely a lead over the exhaust closure. The only effect of this lead is to accelerate the egress of the exhaust gases through the exhaust port 3 for an inappreciable space of time. When the crank pin 8ª reaches the point $e$ the piston 5 closes the port 7 at its upper edge $e$, and the valve 36 is then closed, thus interrupting the flow of live air to the cylinder and ending the period of supercharging which began at the point $d$, as is indicated by the cross-hatched section of Fig. 2. The valves 26 and 60 remain open and the air supply fills the space 34 to pressure until these two valves close at the point $f$ of the diagram.

During the operation of the engine the heating of the air is preferably done automatically when, at reduced loads, the combustion temperatures fall below the predetermined maximum. The heating increases the pressure of discharge of the compressors, but it operates to decrease the amount of air delivered by the said compressors, as a relatively large fixed clearance is provided in these compressors that will retain or absorb a greater proportion or weight of air at higher pressure. Thus the heating of the air decreases automatically the amount of air used for supercharging when the engine load decreases. Conversely, cooling the air charges decreases the discharge pressure of the compressor and increases the weight of the air used for supercharging.

In the conventional pressure volume diagram shown in Fig. 3, the point $h$ corresponds to the position of the piston when at the extreme end of its power or out-stroke; the exhaust port 3 is closed by the piston when it reaches the point $d$, and the charge would be compressed along the line $d—k$ unless supercharging takes place through valves or ports that close when the piston is in line with the point $l$ to which the pressure line has been raised. From point $l$ to point $m$ straight compression takes place and the piston reaches the extreme end of the in-stroke when in line with points $m$, $k$ and $q$, the distance $g$ to $o$ representing the remaining space in the cylinder, or the fixed clearance. The pressure is maintained constant from the point $m$ to $n$ by the combustion of the fuel, and the expansion line $n$ to $a$ is interrupted when the exhaust port is opened by the piston now in line with the point $a$, and the gases are discharged from the cylinder while the piston travels toward the point $h$ and returns to $d$. During most of the exhaust period low pressure air is blown into the cylinder to scavenge it, and while its action is not represented on the diagram of Fig. 3, it is assumed that the cylinder is full of pure air at point $d$ and at atmospheric pressure.

In the embodiment of my invention shown in Fig. 4 the air pump 13' has a double acting piston 14', and therefore two inlet valves 16' and two discharge valves 17'. The air for supercharging, which is supplied by the pistons 5' acting as compressors, is discharged into the receivers or ducts 22' and through jacket 22$^b$ around the exhaust pipe 4' and ducts 24' to the valve chest 25'. The air is regulated by the thermostatically controlled valve 40' and by the manually operated valve 65. The air may be by-passed around the heating jacket 22$^b$ from the duct 22' to the pipe 24' through the pipe 66 by the valve 40'; or it may be directed through the pipe 67 and the heating unit 43' to be heated at starting, or both the valves 40' and 65 may be used for regulation at one time. No provision is here shown for heating the air passing through the pipe 18', through which the air for scavenging is supplied.

The valves 36$^a$ and 36$^b$ have stems 37' connected to the beam 68, which is driven by the eccentric 33' through the linkage 69, shown as containing a Stephenson link 70.

Before starting the engine, the valve 40', because of the contraction of the thermostat 52', is in the position closing the pipe 66, with the pipe 22' remaining open. The manually operated valve 65 is set to direct the air from the compressors down through the pipe 67 and the heating unit 43', and the burner 44' is lighted. The engine is then started and the air from the compressor pistons 5' circulates through the heating unit 43' and the initial temperature of the air is thus elevated. As soon as the exhaust pipe 4' carries a sufficient amount of heat, the valve 65 is shifted to close the pipe 67 and open the pipe 22' throughout, and the burner 44' is extinguished, and thereafter the passage of the air to the heating jacket 22$^b$ is controlled by the thermostatic valve 40', which in regular operation by-passes part of the air through the branch 66, while the remainder flows through the pipe 22' to the main heating unit 22$^b$, proportioned to the speed and load of the engine.

The operation of the valve 60' is limited to supercharging the cylinders 2' through the valves 36$^a$ and 36$^b$. The valve 60' controls the filling of the intermediate space 34' twice in one revolution of the crank shaft 8', opening when the crank pin 8$^b$ reaches the point $c'$ indicated on the diagram of Fig. 5, closing when the point $f$, is reached; it opens again when the crank pin 8$^b$ reaches the point $c^x$, the valve 36$^b$ being closed, but the valve 36$^a$ being open, and the crank pin 8$^c$ is at the point $c'$, thus indicating the beginning of the supercharging of the left-hand cylinder 2'. The valve 60' closes again when the crank pin 8$^c$ is at the point $f^x$ and the diametrically opposed crank 8$^c$ is at the point $f'$. The lead of the opening supercharging valves over the closing of the exhaust is indicated by the arc $c'$ to $d'$, but practically the arc $d'$ to $e'$ indicates the period of supercharging, since the valves 36$^a$ and 36$^b$ operate in the same way as the valve 36 of the engine shown in Fig. 1.

As the valve 60' is operated by the crosshead 11' and beam 71, it will open when either crank pin 8$^b$ or 8$^c$ moving in reverse direction arrives at point $f^x$, while the exhaust ports are closing in the same cylinder, and it will function equally well for the engine moving in either direction and is adapted to reversible engines.

The valves 36$^a$ and 36$^b$ are operated through the Stephenson link 70 by which they may be made to operate with the engine running in reverse. Furthermore, while running in either direction the regulation of the time allowed for each supercharge to enter the cylinders 2' is effected by adjusting the position of the link arc, and such adjustment will have the effect of lengthening or shortening the length of the arc $d'—e'$ of Fig. 5. When the arc $d'—e'$ is shortened, the time allowed for supercharging is less, but the volume of air trapped in the engine cylinder is larger, since the arc $e'—g'$ is correspondingly increased; this arrangement gives the operator a means of adjustment between the initial cylinder pressure and volume, as said pressure will drop when the net period $d'$—$e'$ of valve opening is decreased and the initial volume increased.

In Fig. 6 I have shown the application of my invention to a further form of two-cycle engine, in which the rod $12^2$ connects directly the piston $5^2$ and crank pin $8^d$. The crank case 72 is made air tight, and hence acts as a pump casing. The valves $26^2$ and 75 are mounted on the stem $29^2$ and operated by the eccentric $33^2$ through the linkages $31^2$. The scavenging air is drawn in during the inor up-stroke of the piston $5^2$ through the suction port 73, the valve controlled ports 74, the valves 75 and $26^2$, and passages 76 and 77, to the crank case 72, the suction covering the space between the points $e^2$ and $j$ of the diagram shown in Fig. 8. During the outstroke of the piston $5^2$ compression occurs between the points $j$ and $c^2$. Following this the air is discharged between points $c^2$ and $e^2$ from the crank case 72 into the cylinder through the same passages 77 and 76, the valve $26^2$ and the port $7^2$ (which performs substantially the functions of the ports 6 and 7 of Fig. 1) controlled on one side by the valve $26^2$ and on the other by the piston $5^2$.

The air used for supercharging is supplied by the air pump from the supply of scavenging air, and is therefore at a relatively low pressure. All of the air used in the engine is temperature controlled both before precompression and after precompression, since during suction it is drawn down through the passages 76 and 77 around the heating tubes 80. Any suitable source of heat for heating the tubes 80 may be located in the opening 81. When the engine is running the exhaust gases are led out through the exhaust $4^2$, which has a thermostatically controlled valve 82 by which the exhaust gases may be passed through the heating tubes 80, or may be by-passed directly into the free exhaust branch 83. The thermostatic control may be held out of, or brought into, operation by the latch 84, which engages a spur 85 on the lever $50^2$.

When the engine is running the air is made to travel twice at each turn of the crank shaft through the spaces 76 and 77 around the tubes 80, thereby absorbing sufficient heat to raise the initial temperature and the temperature after compression to induce ignition of the fuel when injected into the cylinders.

When the engine temperature increases and the walls of the cylinder nearest the thermostat $52^2$ become heated, the fluid in the thermostat expands, with a resultant movement of the valve 82 that by-passes part of the exhaust into the branch 83, thus lowering the temperature of the tubes 80 under the action of repeated fresh air charges flowing around the tubes 80. The thermostatic regulator $52^2$ follows the variations of the internal temperature and operates the valve 82, thereby adjusting at all times the heating of the air charges, and maintaining the highest degree of efficient combustion at all loads.

The operation of the multiple piston valves $26^2$ and 75 can be visualized by Fig. 7, showing the exhaust opening at the point $a^2$, while the valve $26^2$ is still closing the valve ports $7^2$, so that the exhaust gases can not enter the valves, as these are filled with part of the fresh charges. When the crank pin $8^d$ passes the point $c^2$ of the diagram of Fig. 7, the valve $26^2$ opens to the port $7^2$ and air entering the cylinder therethrough scavenges and charges the cylinder until the piston $5^2$ closes the exhaust port $3^2$ at point $d^2$ of the diagram, and the air continues to flow through valve $26^2$, thus supercharging until the piston closes the port $7^2$ at point $e^2$ of the diagram of Fig. 7. When at point $e^2$ the valve $26^2$ is full open and does not interfere with an abundant flow of air until it is suddenly interrupted by the piston $5^2$ at the point $e^2$ of the diagram, while the valve $26^2$ does not close until later at the point $f^2$. The compression begins when the crank pin $8^d$ is at the point $e^2$, and ends at the top center $g^2$, the extent of the power stroke being from $g^2$ to $a^2$.

What I claim is:

1. The method of operating an internal combustion engine, which comprises the steps of compressing a quantity of air; preheating a portion of the compressed air; successively mixing quantities of the preheated air with quantities of the compressed air not preheated, to provide successive charges of compressed air having temperatures varied inversely in response to temperature variations of the walls of the power cylinder; delivering said charges free from fuel successively into the combustion chamber of the cylinder; compressing said charges in the cylinder, thereby producing heat for igniting the fuel charge conjointly with the heat of the cylinder wall; and thereupon delivering a charge of fuel into the cylinder while under an igniting temperature.

2. The method of operating an internal combustion engine, which comprises the steps of compressing a quantity of air; preheating a portion of the air by the exhaust gases from the engine; successively mixing quantities of the preheated air with quantities of the compressed air not preheated, to provide successive charges of compressed air having temperatures varied inversely in response to the temperature variations of the walls of the power cylinder; delivering said charges free from fuel successively into the combustion chamber of the cylinder; compressing said charges in the cylinder, thereby producing heat for igniting the fuel charge conjointly with the heat of the cylinder wall; and thereupon delivering a charge of fuel into the cylinder while under an igniting temperature.

3. The method of operating an internal combustion engine, which comprises delivering into the combustion chamber of an internal combustion engine, prior to each compression stroke of the power piston, a charge of heated compressed air free from fuel, inversely varying the temperature of successive charges before delivery, in response to the temperature variations of the walls of the combustion chamber, compressing said charge in the cylinder, thereby producing heat for igniting the fuel charge conjointly with the heat of the cylinder wall, and thereupon delivering the charge of fuel into the cylinder while under an igniting temperature.

4. The method of operating an internal combustion engine of the constant pressure type, which comprises delivering a charge of compressed air free from fuel to the combustion chamber of the engine prior to each power piston compression stroke, the successive charges before delivery having their temperatures increased proportionately to the decrease of temperature of the walls of the combustion chamber below a predetermined temperature range, and decreased proportionately to the increase of temperature of the walls of the combustion chamber, above a predetermined temperature range, compressing said charges in the cylinder, thereby producing heat for igniting the fuel charge conjointly with the heat of the cylinder wall, and thereupon delivering the charge of fuel into the cylinder while under an igniting temperature.

5. The method of operating an internal combustion engine, which comprises charging a cylinder with successive charges of compressed air, each charge being formed by combining two quantities of air of different temperatures, the quantity of lower temperature being varied directly with, and the quantity of higher temperature being varied inversely to, variations in temperature of a wall of said cylinder, and bringing each of said charges, within the cylinder, into contact with a charge of fuel.

6. The method of operating an internal combustion engine, which comprises charging a cylinder with successive charges of compressed air, each charge being formed by combining two quantities of air of different temperatures, the quantity of higher temperature being varied inversely to variations in temperature of a wall of said cylinder; and bringing each of said charges, within the cylinder, into contact with a charge of fuel.

7. The method of operating an internal combustion engine, which comprises charging a cylinder with successive charges of compressed air, each charge being formed by combining two quantities of air of different temperatures, the quantity of lower temperature being varied directly with variations in temperature of a wall of said cylinder; and bringing each of said charges, within the cylinder, into contact with a charge of fuel.

8. The method of operating an internal combustion engine, which comprises charging a cylinder with successive charges of compressed air, each charge being formed by combining two quantities of air of different temperatures, the quantity of lower temperature being varied directly with, and the quantity of higher temperature being varied inversely to, variations in temperature of a wall of said cylinder, and the quantity of higher temperature varying in temperature directly with variations in temperature of the cylinder contents; and bringing each of said charges, within the cylinder, into contact with a charge of fuel.

9. The method of operating an internal combustion engine, which comprises charging a cylinder with successive charges of compressed air, each charge being formed by combining two quantities of air of different temperatures, the quantity of higher temperature being varied inversely to variations in temperature of a wall of said cylinder and varying in temperature with variations in temperature of the cylinder contents; and bringing each of said charges, within the cylinder, into contact with a charge of fuel.

10. The method of operating an internal combustion engine, which comprises introducing into an engine cylinder successive charges of scavenging air, each charge being formed by combining quantities of air of different temperatures, a quantity of lower temperature being varied directly with, and a quantity of higher temperature being varied inversely to, variations in temperature of a wall of said cylinder.

11. The method of operating an internal combustion engine, which comprises introducing into the engine cylinder successive charges of scavenging air, each charge being formed by combining two quantities of air of different temperatures, the quantity of higher temperature being varied inversely to variations in temperature of a wall of said cylinder.

12. The method of operating an internal combustion engine, which comprises introducing into the engine cylinder successive charges of scavenging air, each charge being formed by combining two quantities of air of different temperatures, the quantity of lower temperature being varied directly with variations in temperature of a wall of said cylinder.

13. The method of operating an internal combustion engine, which comprises introducing into the engine cylinder successive charges of compressed air, each charge being formed by combining two quantities of air of different temperatures, the proportion of each quantity being varied for successive charges to compensate for temperature variations of a wall of the cylinder, to maintain a suitable igniting temperature; and bringing each of said charges, within the cylinder, into contact with a charge of fuel.

14. The method of operating an internal combustion engine, which comprises charging the cylinder with successive charges of compressed air having their temperatures varied inversely to temperature variations of a wall of the cylinder, the said charges being formed by combining quantities of air of different temperatures; and bringing each charge, within the cylinder, into contact with a charge of fuel.

15. The method of operating an internal combustion engine, which comprises charging the cylinder with successive charges of compressed air, each charge being formed by combining two quantities of air of different temperatures, the proportion of each quantity of the successive charges being varied so as to impart to the successive charges different degrees of temperature to compensate for variations in the temperature of a wall of the cylinder to maintain a suitable igniting temperature; and bringing each charge, within the cylinder, into contact with a charge of fuel.

16. The method of operating an internal combustion engine, which comprises charging a cylinder with successive charges of compressed air, each charge being formed by combining two quantities of air of different temperatures, the quantity of higher temperature being varied inversely to variations in temperature of a wall of said cylinder; and introducing into the cylinder a charge of fuel after introduction of said quantity of higher temperature.

17. The method of operating an internal combustion engine, which comprises charging a cylinder with successive charges of compressed air, each charge being formed by combining two quantities of air of different temperatures, the quantity of higher temperature being varied inversely to variations in temperature of the cylinder contents; and bringing each of said charges, within the cylinder, into contact with a charge of fuel.

18. The method of operating an internal combustion engine, which comprises charging a cylinder with successive charges of compressed air, each charge being formed by combining two quantities of air of different temperatures, the quantity of higher temperature being varied inversely to variations in temperature of the cylinder contents; and introducing into the cylinder a charge of fuel after introduction of said quantity of higher temperature.

CHARLES A. MULLER.